US010482800B2

(12) United States Patent
Alary

(10) Patent No.: US 10,482,800 B2
(45) Date of Patent: Nov. 19, 2019

(54) DYNAMIC SIGNAGE WITH DIMENSIONAL SYMBOLS

(71) Applicant: INTERNATIONAL DISTRIBUTION OF LUMINAIRES LUMID INC, Montreal (CA)

(72) Inventor: Dominique Alary, Montreal (CA)

(73) Assignee: INTERNATIONAL DISTRIBUTION OF LUMINAIRES LUMID INC., Montreal (CA)

(*) Notice: Subject to any disclaimer, the term of this patent is extended or adjusted under 35 U.S.C. 154(b) by 24 days.

(21) Appl. No.: 15/709,005

(22) Filed: Sep. 19, 2017

(65) Prior Publication Data
US 2018/0350279 A1  Dec. 6, 2018

Related U.S. Application Data

(60) Provisional application No. 62/512,857, filed on May 31, 2017.

(51) Int. Cl.
*G09F 13/04* (2006.01)
*G06F 3/147* (2006.01)
*F21V 8/00* (2006.01)
*G09F 9/305* (2006.01)

(52) U.S. Cl.
CPC ....... *G09F 13/0404* (2013.01); *G02B 6/0021* (2013.01); *G02B 6/0068* (2013.01); *G06F 3/147* (2013.01); *G09F 9/305* (2013.01); *G09G 2300/026* (2013.01)

(58) Field of Classification Search
CPC .......... G09F 13/04; G09F 13/0404; G09F 2013/0436; G09F 9/305; G02B 6/0021; G02B 6/0068; G09G 2300/026
See application file for complete search history.

(56) References Cited

U.S. PATENT DOCUMENTS

| 2,149,363 | A | * | 3/1939 | Rivkin | G09F 13/06 40/452 |
| 3,949,504 | A | | 4/1976 | Willis et al. | |
| 4,276,705 | A | * | 7/1981 | Barth | G09F 13/06 40/547 |
| 4,639,724 | A | | 1/1987 | Togneri | |

(Continued)

FOREIGN PATENT DOCUMENTS

WO  2015155311  10/2015

OTHER PUBLICATIONS

US 9,164,536 B2, 10/2015, Qi et al. (withdrawn)

*Primary Examiner* — Gary C Hoge
(74) *Attorney, Agent, or Firm* — Norton Rose Fulbright Canada LLP

(57) ABSTRACT

A dynamic sign, and method for manufacture thereof, is provided. The sign comprises a display comprising at least one dynamic display surface configured for projecting dynamic graphical elements. The sign also comprises a perforated mask superposed on the at least one dynamic display surface of the display, the mask comprising at least one opening formed therein. The sign further comprises at least one optical guide inserted into the at least one opening, the at least one optical guide positioned for carrying light from the display through the at least one opening and allowing the dynamic graphical elements to be seen therethrough.

20 Claims, 7 Drawing Sheets

(56) References Cited

U.S. PATENT DOCUMENTS

| | | | |
|---|---|---|---|
| 5,324,224 A * | 6/1994 | Anderson | A63H 33/26 362/184 |
| 5,536,558 A | 7/1996 | Shelton | |
| 5,644,860 A * | 7/1997 | Piper | G09F 13/04 248/222.11 |
| 5,966,856 A | 10/1999 | Alu | |
| 6,189,246 B1 * | 2/2001 | Gorthala | G09F 7/06 40/427 |
| 7,234,856 B2 | 6/2007 | Bahramian | |
| 8,074,387 B2 | 12/2011 | Mancuso | |
| 8,142,061 B2 | 3/2012 | Jablonski | |
| 8,302,336 B2 | 11/2012 | Li et al. | |
| 8,467,177 B2 | 6/2013 | Mathew et al. | |
| 8,870,430 B2 | 10/2014 | Kamikatano et al. | |
| 2006/0225327 A1 * | 10/2006 | Peters | G09F 9/305 40/547 |
| 2011/0167688 A1 | 7/2011 | Frost | |

* cited by examiner

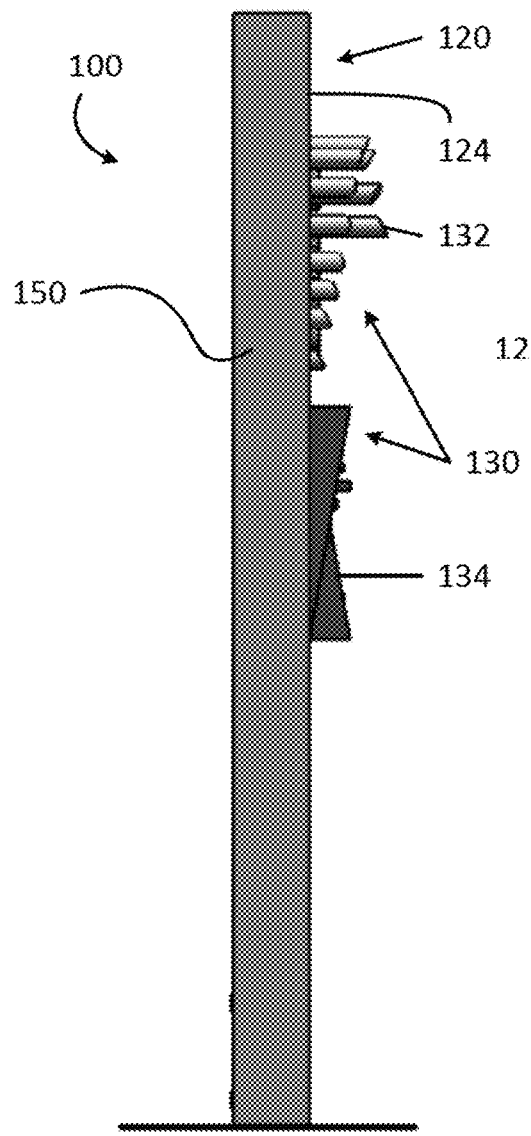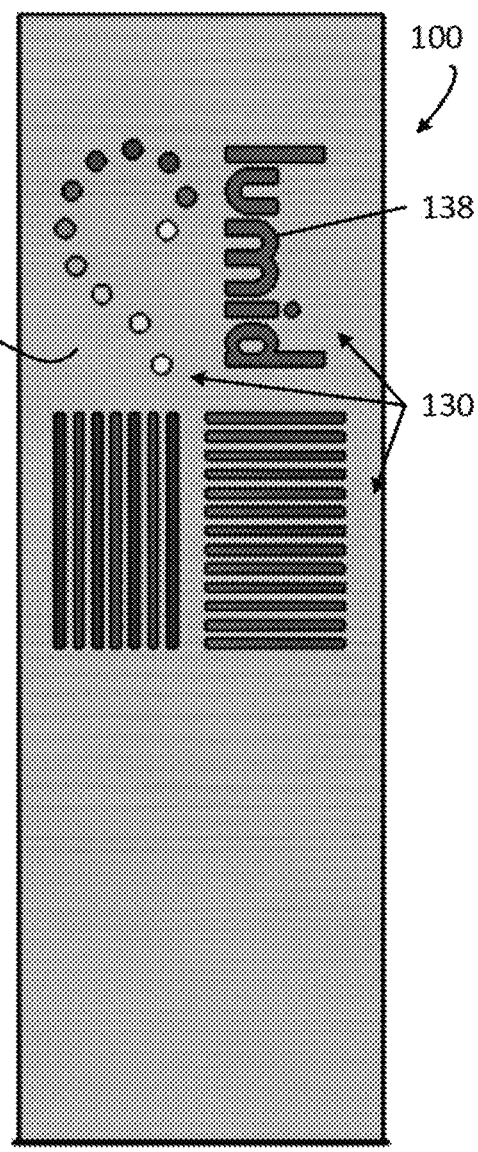
FIGURE 4A
FIGURE 4B
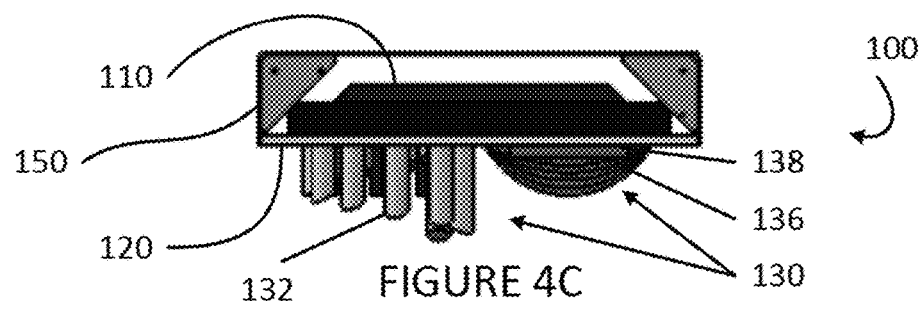
FIGURE 4C

DYNAMIC SIGNAGE WITH DIMENSIONAL SYMBOLS

CROSS-REFERENCE TO RELATED APPLICATIONS

The present application claims the benefit of U.S. Provisional Patent Application No. 62/512,857 filed on May 31, 2017, the contents of which are hereby incorporated in their entirety by reference.

TECHNICAL FIELD

The present disclosure relates generally to signage, and more specifically to signage having dimensional symbols.

BACKGROUND

Dimensional symbols (also known as dimensional letters) are a type of signage where letters, logos, and other various shapes are cut out of a material and affixed to a wall or other surface. Spacing between the wall and the shapes can be provided to better define the letters, and in some cases lights are placed between the wall and the letters, or within the letters themselves. This "backlighting" provides an illuminating effect for the dimensional symbols. Traditionally, the illuminating effect is halo-like, surrounding the cut-out letters. Some more modern dimensional symbols are somewhat translucent, providing a glow-type effect when backlit.

This traditional models for dimensional symbols have been around for a long time. There is a desire to enhance the existing signage options.

SUMMARY

In accordance with a broad aspect, there is provided a dynamic sign, comprising: a display comprising at least one dynamic display surface configured for projecting dynamic graphical elements; a perforated mask superposed on the at least one dynamic display surface of the display, the mask comprising at least one opening formed therein; and at least one optical guide inserted into the at least one opening, the at least one optical guide positioned for carrying light from the display through the at least one opening and allowing the dynamic graphical elements to be seen therethrough.

In some embodiments, the dynamic graphical elements comprise video.

In some embodiments, the video comprises at least one animation.

In some embodiments, the dynamic sign further comprises a fastener for securing the sign to a structure, the fastener attached to at least one of the mask and the display.

In some embodiments, the dynamic sign further comprises a frame attached to at least one of the display and the mask via the fastener.

In some embodiments, the structure is a wall.

In some embodiments, the structure is a ceiling.

In some embodiments, the mask is formed of an opaque material.

In some embodiments, the mask is formed of a translucent material.

In some embodiments, the at least one opening forms at least one alphanumeric symbol.

In some embodiments, the at least one opening forms at least one logo.

In some embodiments, the display comprises a plurality of adjacent display tiles.

In some embodiments, the mask is replaceable.

In accordance with another broad aspect, a method of manufacture of a dynamic sign is provided. At least one opening is formed in a material base to produce a perforated mask. The perforated mask is superposed over at least one dynamic display surface of a display. At least one optical guide is inserted into the at least one opening.

In some embodiments, superposing the perforated mask over the at least one dynamic display surface of the display comprises affixing the perforated mask to the display with at least one fastener.

In some embodiments, superposing the perforated mask over the at least one dynamic display surface of the display comprises removably mating at least one portion of the perforated mask with the display.

In some embodiments, inserting the at least one optical guide into the at least one opening comprises affixing the at least one optical guide to the mask.

In some embodiments, the method of manufacture further comprises fastening at least one of the screen and the display to a structure.

In some embodiments, fastening at least one of the screen and the display to the structure comprises fastening the least one of the screen and the display to a wall.

In some embodiments, fastening at least one of the screen and the display to the structure comprises fastening the least one of the screen and the display to a ceiling.

BRIEF DESCRIPTION OF THE DRAWINGS

The invention will be described in greater detail with reference to the accompanying drawings, in which:

FIGS. 4A-C are side, front, and top views of the example dynamic sign of FIG. 3;

DETAILED DESCRIPTION

Figure 1:
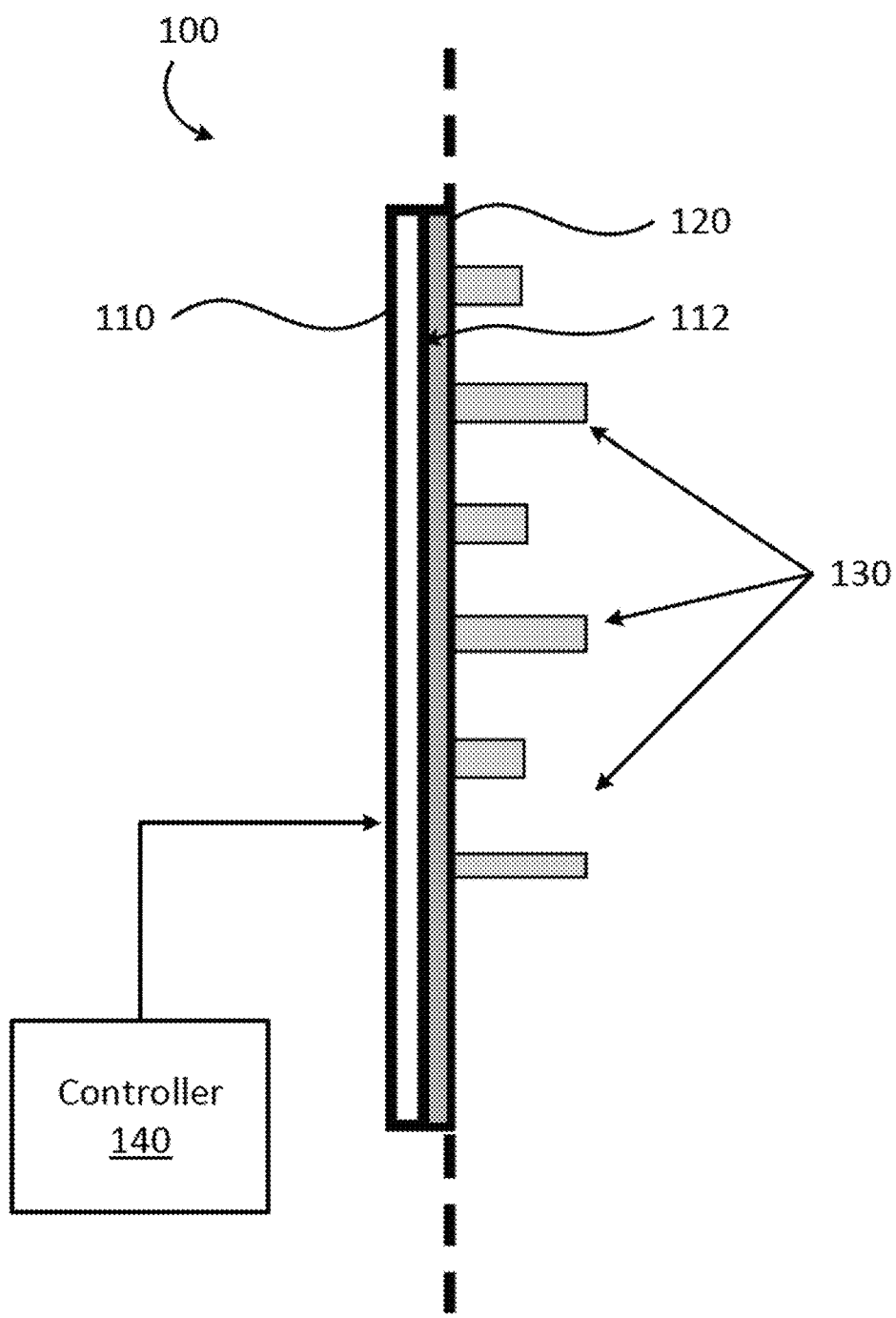
FIG. 1 is a block diagram illustrating a side view of an embodiment of a dynamic sign.

With reference to FIG. 1, there is shown a block diagram illustrating a portion of a dynamic sign 100. The sign 100 is composed of a display 110, a mask 120, one or more optical guides 130, and a controller 140. The mask 120 is superposed or overlain over the display 110, and the mask 120 retains the optical guides 130 in openings formed in the mask 120, as described hereinbelow. The controller is communicatively coupled with the display 110.

The display 110 has at least one dynamic display surface 112 which projects dynamic graphical elements therefrom, including various images, video, graphics, animations, and the like. In some embodiments the display 110 includes a plurality of panels which each have a respective dynamic display surface 112. For example, the display 110 includes a plurality of panels organized in a grid pattern. In some embodiments, each of the plurality of panels is a rectangle having equal side length. In other embodiments, each of the plurality of panels is a square having equal length and width. In another example, the panels which make up the display 110 have differing shapes and sizes, and are arranged in an irregular pattern. Alternatively, or in addition, in some embodiments the display 110 includes a panel having a plurality of dynamic display surfaces 112, for example a double-sided panel.

The display 110 is communicatively coupled to the controller 140, which may be any suitable processor, electronic control system, or other processing device. The display 110, via the controller 140, is configured for receiving input signals over one or more connectors, which may be wireless and/or wired. The connectors use any suitable standard, including HDM I™, DisplayPort™, VGA, S-Video™, USB™, Miracast™, and the like. The controller 140 of the display 110 is configured for processing the input signals in any suitable fashion for displaying any visual content contained in the input signals, including the aforementioned dynamic graphical elements, via the display 110. In some embodiments, the display 110 also includes one or more sound-producing devices, for example one or more speakers, and the controller 140 of the display 110 is configured for causing the speakers to output any audio contents contained in the input signals.

The display 110 may be made of any suitable technology, including an LCD (liquid crystal display) panel, a plasma panel, an LED (light-emitting diode) video board, an OLED (organic light-emitting diode) panel, and the like. In some embodiments, the display is a television. In other embodiments, the display is a computer monitor. In some embodiments, the display 110 includes a curved panel, a parabolic panel, or any other suitably warped panel. In addition, the display 110 may take any suitable shape or size, including rectangular, square, circular, and the like, and may be dimensioned according to any suitable ratio, including 4:3, 16:9, 16:10, and the like. The display 110 provides any suitable resolution, including 1080p (also known as "Full HD" (high definition)), 4k, 8k, and the like, and any suitable brightness.

Superposed on the one or more dynamic display surfaces 112 of the display 110 is the mask 120. The mask 120 may be affixed to the display 110 in a permanent fashion, for example via an adhesive or fastener (e.g. screws), or may be removably affixed to the display 110, for example via latches, hooks, and the like. For example, a top portion of the mask 120 can be provided with one or more hooks which are configured for slidably engaging with a top portion of the display 110. In another example, embedded in the mask 120 are one or more magnets which are configured for removably joining the mask 120 with the display 110 via one or more magnetic or ferromagnetic surfaces on the display 110. In a further example, a glue, epoxy, or other adhesive is used to affix the mask 120 to the display 110 in a substantially permanent fashion.

The mask 120 may be formed of a substantially opaque material, for example wood, metal, stone, tile, and the like, or of any suitable combination thereof. Alternatively, the mask 120 may be formed of a translucent material, for example plastic, quartz, glass, and the like. In some further embodiments, the mask 120 is made of a mix of opaque and translucent materials. For example, the mask 120 defines a checkered pattern of alternating opaque and translucent materials, or a striped pattern of alternating opaque and translucent materials, or any other suitable pattern. The mask 120 may take any suitable shape and size, for example based on the dimensions of the display 110.

In some embodiments, the mask 120 is placed overtop the display 110 with a predetermined gap between the mask 120 and the dynamic display surface 112. For example, the display 110 produces a considerable amount of heat when turned on, and the gap between the display 110 and the mask 120 provides a channel for circulating air to cool the display 110. In other embodiments the mask 120 is substantially flush with the dynamic display surface 112 of the display 110, for example being in contact therewith.

Figure 2:
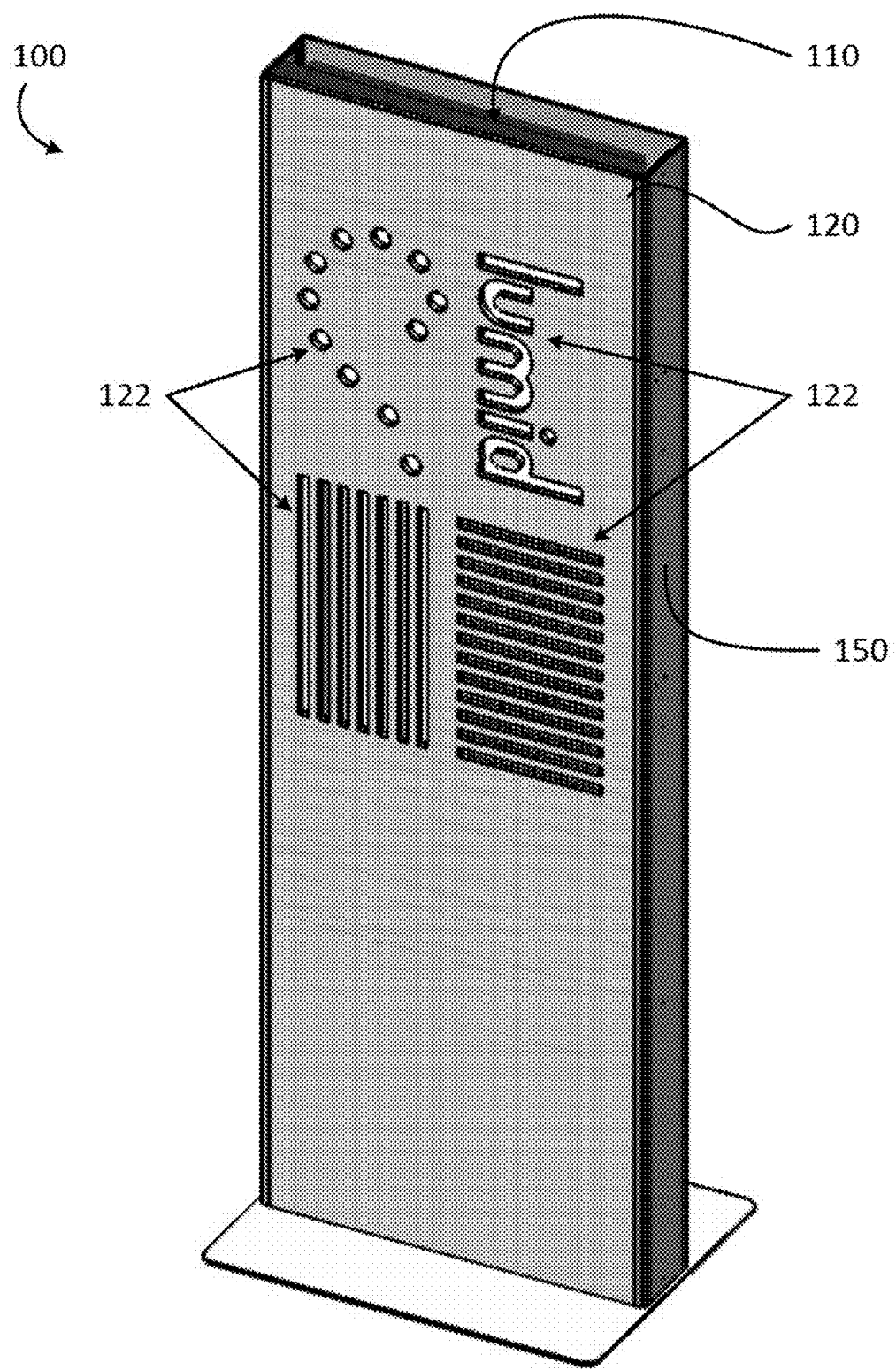
FIG. 2 is a perspective view of an example dynamic sign.
Figure 3:
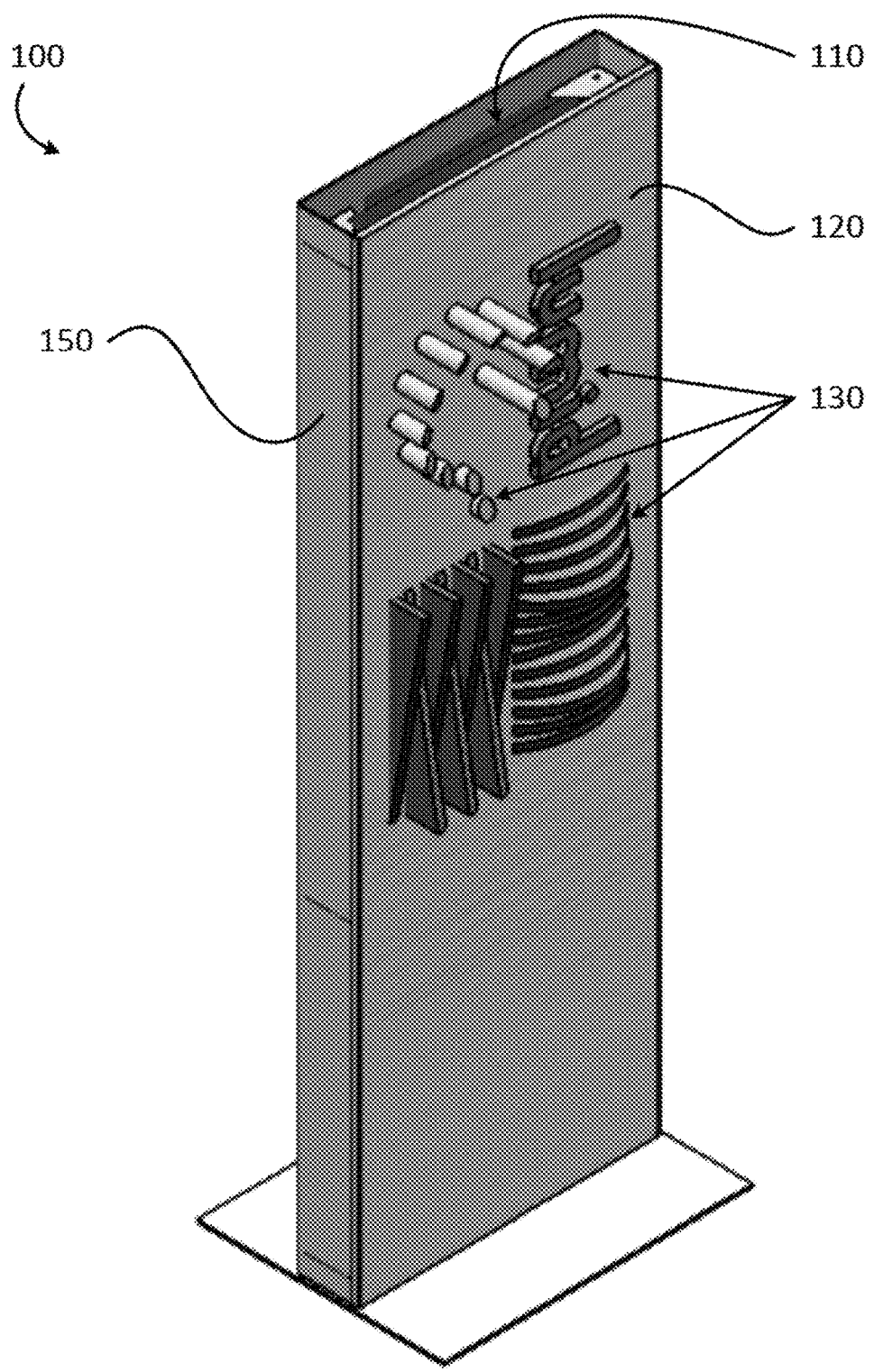
FIG. 3 is a perspective view of the dynamic sign of FIG. 2 with example dynamic dimensional symbols.

With additional reference to FIG. 2, the mask 120 has formed therein at least one opening 122. The openings 122 may be formed in any suitable fashion, for example by the action of a jigsaw or other mechanical cutter, a high-pressured fluid cutter, a laser cutter, or using any other suitable cutting implement, on a material base used for the mask 120. The openings 122 may form any number of shapes, including alphanumeric symbols (letters, numbers, and the like), logos, and the like. The display 110, and the dynamic display surface 112 thereof, is visible through the openings 122 in the mask 120, such that light emitted by the display 110 and which forms the dynamic graphical elements pass through the openings 122.

In some embodiments, the particular shape, size, and number of panels which compose the display 110 are selected to substantially correspond to the shape, size, and number of openings 122 in the mask 120. For example, when the mask 120 has three openings 122 shaped like spirals, the display 110 has three circular panels which have a size equivalent to or slightly larger than the openings 122, or otherwise appropriate for projecting dynamic graphical elements through the openings 122. In another example, the openings 122 include a dot pattern in a first portion of the mask 122 and an oval-shaped symbolic logo in a second portion of the mask 122. In this example, the display 110 has a first rectangular panel which is positioned so as to be superposed by the first portion of the mask to align with the dot pattern, and a second, oval-shaped panel which is positioned so as to be superposed by the second portion of the mask to align with the symbolic logo. In this way, the display 110 is not required to span the entire height and/or width of the dynamic sign 100, but instead can be restricted to certain key portions thereof, where, when overlain by the mask 120, the dynamic graphical elements projected by the display 110 are visible via the openings 122 of the mask 120.

With continued reference to FIG. 1 and with additional reference to FIGS. 3 and 4A-D, inserted into the one or more openings 122 are the optical guides 130. The optical guides 130 provide a medium for light from the dynamic display surface 112 of the display 110 to travel through the mask 120, and are positioned for carrying light from the display 110 through the at least one opening 122. The optical guides 130 may be made from any suitable transparent or translucent material, including glass, acrylic, polycarbonate, mesh, for example a woven translucent material, or any translucent stone or mineral, for example quartz.

Figure 4D:
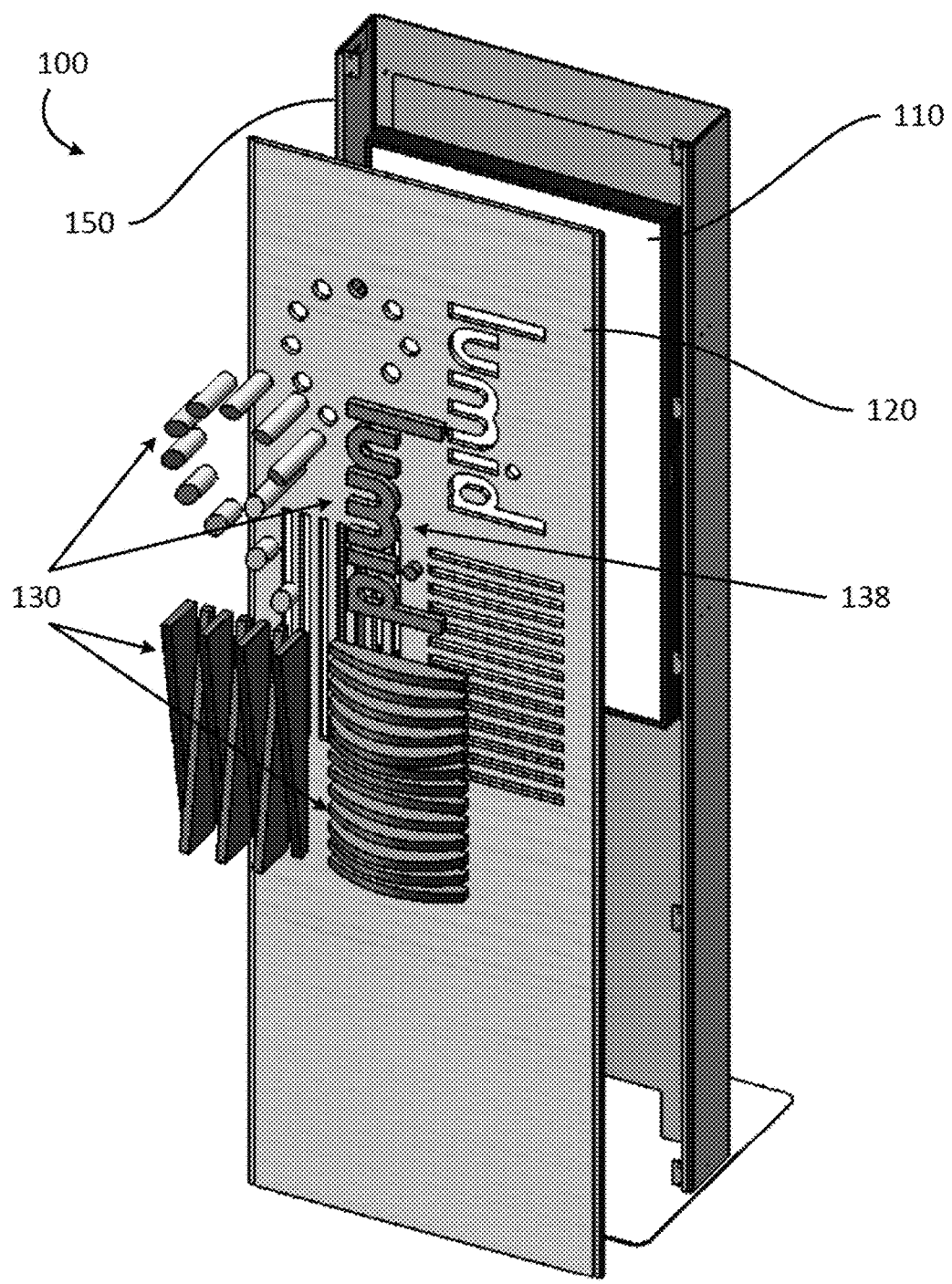
FIG. 4D is an exploded view of the example dynamic sign of FIG. 3.

The optical guides 130 may be retained in the openings 122 via friction, or be retained therein via one or more adhesives, such as glue, epoxy, or in any other suitable fashion. The optical guides 130 may take on any suitable shape, and may project from the mask 120 in a substantially perpendicular fashion, or may exhibit any suitable level of curvature or pattern of bending. For example, and with reference to FIGS. 4A and 4C, some of the optical guides 130 are shaped as elongated cylinders 132 which may have an angled distal end (as illustrated) or a flat distal end. Some of the optical guides 130 are triangular prisms 134 of varying height, and some are half-disks 136 of varying radius and eccentricity. With reference to FIGS. 4B and 4D, the optical guides 130 used to make logo lettering 138 are substantially flat, letter-shaped, and have a suitable thickness for projecting beyond the mask 120. Still other designs and shapes for the optical guides 130 are considered.

In some embodiments, the number of optical guides 130 is equivalent to the number of openings 122 in the mask 120. In other embodiments, the sign 100 includes fewer optical guides 130 than the number of openings 122. For example, some openings share an optical guide 130, such as a Y-shaped cylindrical optical guide 130 which is inserted into two circular openings 122 of the mask 120. In another example, a block-shaped optical guide 130 has a plurality of pegs which are configured for being inserted into respective circular openings 122 of the mask 120. In a further example, some of the openings 122 are not provided with an optical guide 130.

The optical guides 130 are positioned for carrying light from the display 110 through the at least one opening 122 of the mask 120. Thus, portions of the dynamic graphical elements, including the various images, video, graphics, and animations, displayed by the display 110 take on the shape of the openings 122 and are visible via the optical guides when viewing the sign 100. In particular, any alphanumeric symbols, logos, or other shapes carved into the mask 120 (in the form of the openings 122) take on part of all of the colour, brightness, and any animated characteristics of the dynamic graphical elements displayed on portions of the display 110 with which they are aligned.

In addition, and with continued reference to FIG. 4A, in some embodiments the optical guides 130 extend beyond an outer surface 124 of the mask 120. By extending beyond the outer surface 124 of the mask 120, the optical guides 130 provide a three-dimensional effect to the shapes and symbols carved into the mask 120, in the form of the openings 122. Moreover, portions of the optical guides 130 which extend beyond the outer surface 124 also carry light from the display 110, and give a three-dimensional effect to those portions of the optical guides. In this fashion, the optical guides 130 provide a three-dimensional animated effect to the shapes and symbols of the openings 122, as provided by the dynamic graphical elements projected by the display 110.

Figure 5C:
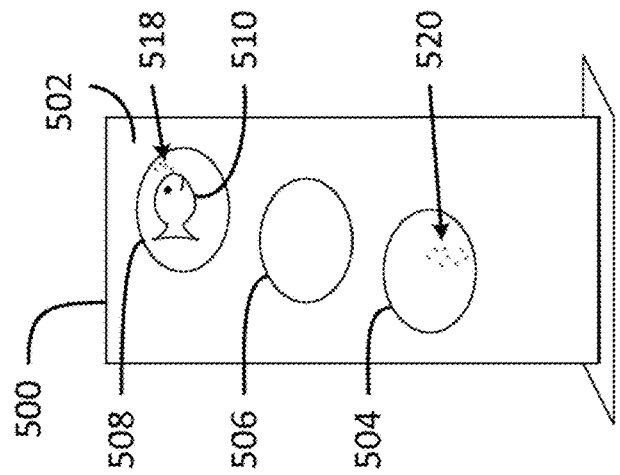
FIGS. 5A-C are front views of an example dynamic sign with example dynamic graphical elements.
Figure 5B:
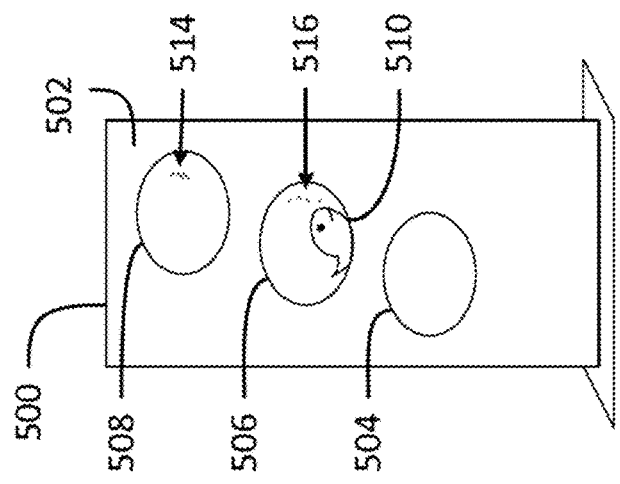
Figure 5A:
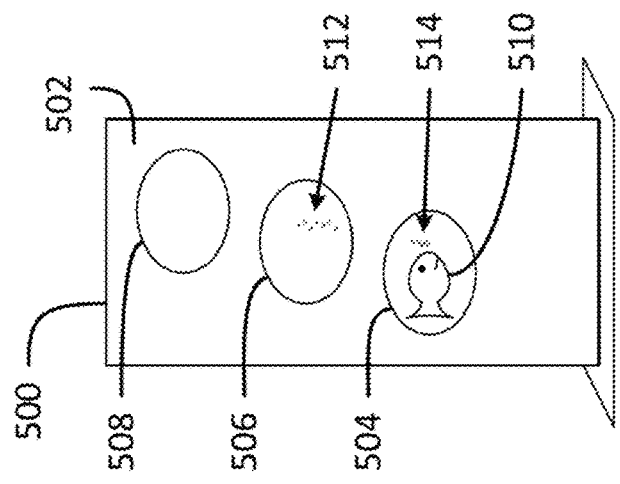

With reference to FIGS. 5A-C, an embodiment of a dynamic sign 500 is shown. A mask 502 of the dynamic sign 500 is overlain on a screen in any suitable fashion, as described hereinabove. The mask 502 has three oval-shaped openings formed therein, and inserted into the openings are three optical guides 504, 506, 508. The optical guides 504, 506, 508 may have different thicknesses, i.e. project from the mask 502 at different heights. For example, the bottommost optical guide 504 has a first thickness which is less than a second thickness of the middle optical guide 506, but greater than a third thickness of the topmost optical guide 508. In some embodiments, a distal surface of each of the optical guides 504, 506, 508 is substantially flat and parallel to an outer surface of the mask 502. In other embodiments, the distal surfaces of the optical guides 504, 506, 508 have an undulating or wave-like shape.

With continued reference to FIG. 5A, a first "snapshot" of the dynamic screen 500 is shown. The screen of the dynamic sign 500 projects a plurality of dynamic graphical elements as part of an underwater or ocean theme, including a virtual fish 510. The virtual fish 510 may be part of a video feed sent to the dynamic sign 500, or may be generated by the dynamic sign 500 via a program or other software. The virtual fish 510 is animated to swim or otherwise move around, and to produce streams of bubbles. In FIG. 5A, the virtual fish 510 is visible via the bottommost optical guide 504, a first stream of bubbles 512 previously produced by the virtual fish 512 has ascended "upward" (i.e. toward a top portion of the dynamic sign 500) and is visible in the middle optical guide 506, and a second stream of bubbles 514 being produced by the virtual fish 510 is visible in proximity thereto in the bottommost optical guide 504.

With continued reference to FIG. 5B, the various dynamic graphical elements displayed via the optical guides 504, 506, 508, including the virtual fish 510 and the streams of bubbles 512, 514, are configured to display motion and/or other suitable animations. FIG. 5B shows a second snapshot of the dynamic screen 500 taken at some time after the first snapshot of FIG. 5A. In FIG. 5B, the virtual fish 510 has swum up, or otherwise moved, to be partially visible via the middle optical guide 506, the second stream of bubbles 514 has ascended to the topmost optical guide 506, and the first stream of bubbles 512 is no longer visible on the dynamic screen 500. In addition, a third stream of bubbles 516 being produced by the virtual fish 510 is visible in proximity thereto in the middle optical guide 506.

It should be noted that in the time between the first and second screenshots, the virtual fish 510 "travels" between the bottommost optical guide 504 and the middle optical guide 506. The virtual fish 510 may take any suitable path, and in some embodiments takes a path which partially or wholly obfuscates the virtual fish 510 for part of the path. As shown in FIG. 5B, a portion of the virtual fish 510 is not visible via the optical guide 506, and is hidden by opaque portions of the mask 502.

With continued reference to FIG. 5C, a third snapshot of the dynamic screen 500 is shown, the third snapshot being of the dynamic screen 500 at some time after the second snapshot of FIG. 5B. In FIG. 5C, the virtual fish 510 has swum up, or otherwise moved, to be visible via the topmost optical guide 508, and the second and third streams of bubbles 514, 516 are no longer visible on the dynamic screen 500. In addition, a fourth stream of bubbles 518 being produced by the virtual fish 510 is visible in proximity thereto in the topmost optical guide 508, and a fifth stream of bubbles 520 is visible in the bottommost optical guide 504.

In some embodiments, the dynamic screen 500 is further configured for displaying additional virtual fish, other underwater creatures, and/or other underwater objects and elements. For example, the topmost optical guide 506 can display waves, surf, and/or a horizon above the virtual water shown in the bottommost and middle optical guides 504, 506. The dynamic screen 500 is configured for displaying various dynamic graphical elements, including any animations of the dynamic graphical elements. The dynamic graphical elements may be moved, shrunk, grown, warped, skewed, or be subjected to any other suitable animation or alteration, and these animations and alterations are visible via the optical guides 504, 506, 508.

Figure 6B:
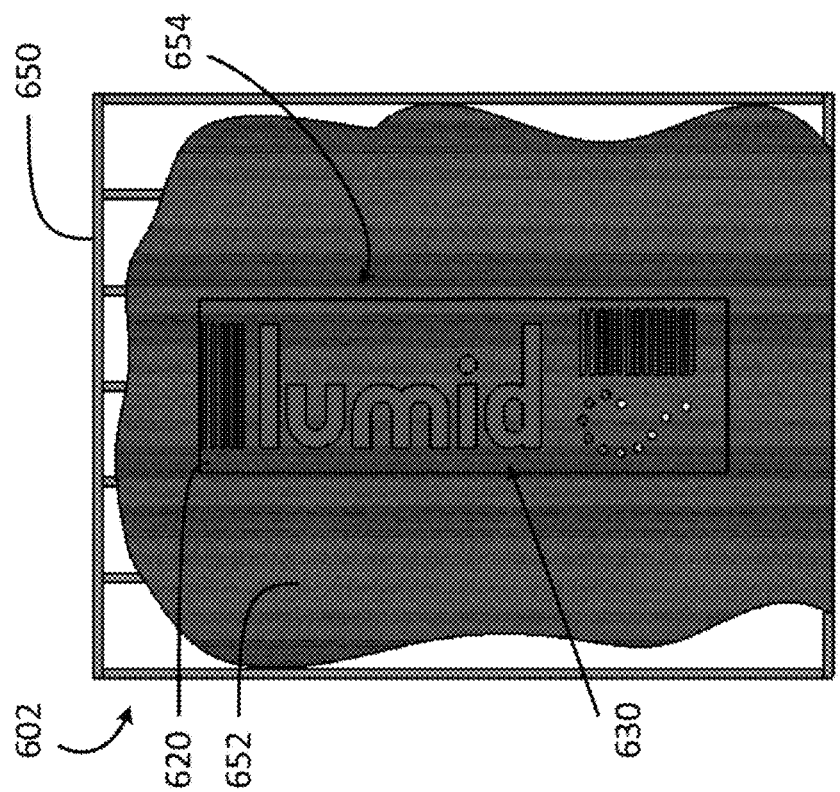
FIGS. 6A-B are front views of example integrated dynamic signs.
Figure 6A:
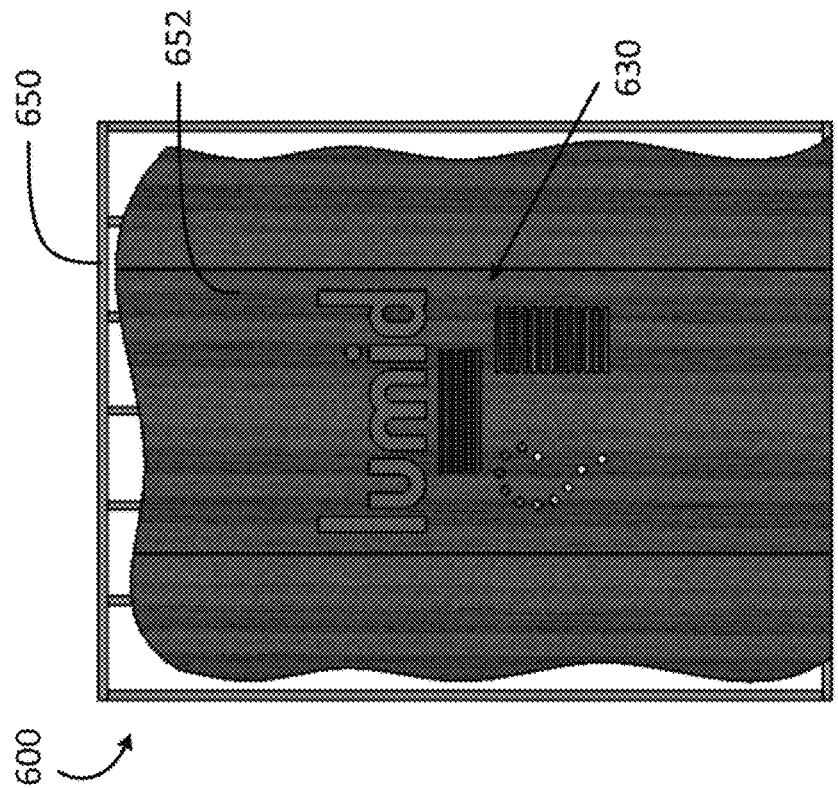

Although the dynamic signs 100, 500 have been shown as standalone signs, it should be noted that other embodiments of the dynamic signs described herein may also be integrated or encased in other structures, for example walls, ceilings, and the like. With reference to FIGS. 6A and 6B, there are shown dynamic signs 600 and 602 which are integrated into a wall structure 650. The wall structure 650 can be any suitable wall, ceiling, partition, and the like.

With continued reference to FIG. 6A, the dynamic sign 600 is formed within a wall structure 650 which has a wall surface 652. The wall surface 652 can be composed of a plurality of panels, or can be a continuous surface. Formed within the wall surface 652 are a plurality of openings, in which are inserted optical guides 630, which may provide substantially similar functionality as the optical guides 130. A display, which may be similar to the display 110, is inserted within the wall structure 650 behind the portion of the wall surface 652 where the optical guides 630 are inserted. In this fashion, the portion of the wall surface where the optical guides 630 are inserted superpose the display. The dynamic sign 600 is integrated within the wall structure 650, for example to appear as part of the wall structure 650 itself.

With continued reference to FIG. 6B, the wall surface 652 of the wall structure 650 has formed therein an aperture 654. The dynamic sign 602 comprises a display, which may be similar to the display 110, and which is inserted into the wall structure 650 and located behind the wall surface 652 via the aperture 654 formed in the wall surface 652. The display can be secured to the wall structure 650 in any suitable fashion. The display is encased in the wall structure 650 by way of a panel 620, which is inserted in and retained within the aperture 654 formed in the wall surface 652, thereby being superposed on the display. In some embodiments, the panel 620 is retained within the wall surface 652 using a removable fastener, for example latches, press-seals, and the like. In other embodiments, the panel 620 is retained within the wall surface 652 using a substantially permanent fastener, for example glue, epoxy, and the like. In some embodiments, the panel 620 is substantially flush with the wall surface 652. In other embodiments, the panel 620 is recessed or extends beyond the wall surface 652.

The panel 620 has formed therein a plurality of openings, much like the mask 120 of the dynamic sign 100. The openings are configured for receiving the optical guides 630, which are rotated vis-à-vis the configuration of the optical guides 630 in dynamic sign 600. It should be noted that various different configurations of the optical guides 630, and indeed the optical guides 130, are considered. The dynamic sign 602, having the panel 620 which is separate from the wall structure 650, provides a dynamic sign embodiment which may be more easily replaceable. For example, in a shared space, such as a conference room, different panels 620 having different openings and optical guides 630 could be used depending on the organization using the conference room. By changing the panel 620, signage for the relevant organization can be provided. In addition, the dynamic sign 602, having the panel 620 which may be removable from the wall structure 650, can simplify repair and/or replacement of the display inserted into the wall structure 650 in the event of malfunction or failure.

In still further embodiments, the herein-described dynamic sign is implemented as part of other free-standing structures, including bollards, light fixtures or other lighting implements, obelisks, pillars, poles posts, sculptures, totems, and the like. In some such embodiments, one or more apertures are formed in an outer surface of the free-standing structure, thereby forming the mask of the dynamic sign, which is integrated with the free-standing structure. The display is positioned within a hollow interior of the free-standing structure, as suitable, and the optical guides are inserted into the apertures formed in the outer surface of the free-standing structure.

Manufacturing the dynamic signs 100, 500, 600 may be performed by implementing a method of manufacture. At least one opening, for example the openings 122, are formed in a material base to produce a perforated mask, for instance the perforated mask 120. The base material can be any suitable material, which may be opaque and/or translucent, and the openings can be formed using any suitable perforation technique. The openings 122 may take on various shapes and sizes, including geometric shapes, alphanumeric characters, logos, and the like.

The perforated mask 120 is superposed over at least one dynamic display surface of a display, for example the display 110. In some embodiments, superposing the mask 120 over the display 110 includes affixing the mask 120 to the display 110 using one or more fasteners. In other embodiments, superposing the mask 120 over the display 110 includes mating part of the mask 120, for example hooks or latches, with the display 110. Still other ways of superposing the mask 120 over the display 110 are considered.

At least one optical guide, for example one or more of the optical guides 130, is inserted into the openings 122. In some embodiments, the optical guides 130 are retained in the mask 120 by friction. In other embodiments, the optical guides are affixed to the mask 120 using adhesives or other substances.

In some embodiments, at least one of the screen and the display is fastened to a structure, for example a wall or ceiling. In some embodiments, the optical guides 130 are inserted into the mask 120 before the mask 120 is superposed over the display 110. In other embodiments, the mask 120 is first superposed over the display 110, and thereafter the optical guides 130 are inserted into the mask 120

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of dynamic signs with dimensional symbols described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A dynamic sign, comprising:
    a display comprising at least one dynamic display surface configured for projecting dynamic graphical elements;
    a perforated mask superposed on the at least one dynamic display surface of the display, the mask comprising at least one opening formed therein; and
    at least one optical guide inserted into the at least one opening, the at least one optical guide positioned for carrying light from the display through the at least one opening and allowing the dynamic graphical elements to be seen therethrough.

2. The dynamic sign of claim 1, wherein the dynamic graphical elements comprise video.

3. The dynamic sign of claim 1, wherein the video comprises at least one animation.

4. The dynamic sign of claim 1, further comprising a fastener for securing the sign to a structure, the fastener attached to at least one of the mask and the display.

5. The dynamic sign of claim 4, further comprising a frame attached to at least one of the display and the mask via the fastener.

6. The dynamic sign of claim 4, wherein the structure is a wall.

7. The dynamic sign of claim 4, wherein the structure is a ceiling.

8. The dynamic sign of claim 1, wherein the mask is formed of an opaque material.

9. The dynamic sign of claim 1, wherein the mask is formed of a translucent material.

10. The dynamic sign of claim 1, wherein the at least one opening forms at least one alphanumeric symbol.

11. The dynamic sign of claim 1, wherein the at least one opening forms at least one logo.

12. The dynamic sign of claim 1, wherein the display comprises a plurality of adjacent display tiles.

13. The dynamic sign of claim 1, wherein the mask is replaceable.

14. A method of manufacture of a dynamic sign, comprising:
    forming at least one opening in a material base to produce a perforated mask;
    superposing the perforated mask over at least one dynamic display surface of a display; and
    inserting at least one optical guide into the at least one opening.

15. The method of manufacture of claim 14, wherein superposing the perforated mask over the at least one dynamic display surface of the display comprises affixing the perforated mask to the display with at least one fastener.

16. The method of manufacture of claim 14, wherein superposing the perforated mask over the at least one dynamic display surface of the display comprises removably mating at least one portion of the perforated mask with the display.

17. The method of manufacture of claim 14, wherein inserting the at least one optical guide into the at least one opening comprises affixing the at least one optical guide to the mask.

18. The method of manufacture of claim 14, further comprising fastening at least one of the screen and the display to a structure.

19. The method of manufacture of claim 18, wherein fastening at least one of the screen and the display to the structure comprises fastening the least one of the screen and the display to a wall.

20. The method of manufacture of claim 18, wherein fastening at least one of the screen and the display to the structure comprises fastening the least one of the screen and the display to a ceiling.

* * * * *